(12) United States Patent
Melanson et al.

(10) Patent No.: US 12,255,481 B2
(45) Date of Patent: Mar. 18, 2025

(54) PULSED CURRENT BATTERY MANAGEMENT SYSTEM

(71) Applicant: Cirrus Logic International Semiconductor Ltd., Edinburgh (GB)

(72) Inventors: John L. Melanson, Austin, TX (US);
Eric J. King, Austin, TX (US);
Emmanuel Marchais, Dripping Springs, TX (US)

(73) Assignee: Cirrus Logic Inc., Austin, TX (US)

( * ) Notice: Subject to any disclaimer, the term of this patent is extended or adjusted under 35 U.S.C. 154(b) by 645 days.

(21) Appl. No.: 17/395,682

(22) Filed: Aug. 6, 2021

(65) Prior Publication Data
US 2022/0344958 A1    Oct. 27, 2022

Related U.S. Application Data

(60) Provisional application No. 63/179,946, filed on Apr. 26, 2021.

(51) Int. Cl.
*H02J 7/00* (2006.01)

(52) U.S. Cl.
CPC ......... *H02J 7/00711* (2020.01); *H02J 7/0048* (2020.01); *H02J 7/005* (2020.01); *H02J 7/00714* (2020.01)

(58) Field of Classification Search
CPC ...... H02J 7/00711; H02J 7/0048; H02J 7/005; H02J 7/00714

USPC .................................................. 320/139, 140
See application file for complete search history.

(56) References Cited

U.S. PATENT DOCUMENTS

| 7,952,231 B1 * | 5/2011 | Zansky ..................... H02J 7/34 307/44 |
| 2010/0066309 A1 | 3/2010 | Labrunie et al. |
| 2014/0210398 A1 | 7/2014 | Powell et al. |
| 2018/0123383 A1 * | 5/2018 | Tian .................. H02M 3/33523 |

OTHER PUBLICATIONS

International Search Report and Written Opinion of the International Searching Authority, International Application No. PCT/US2022/023604, mailed Jul. 15, 2022.
Kuperman, A., et al.: "Battery-ultracapacitor hybrids for pulsed current loads: A review", Renewable and Sustainable Energy Reviews, Elseviers Science, New York, NY, US., vol. 15, No. 2, Feb. 1, 2011, pp. 981-992.

* cited by examiner

*Primary Examiner* — Richard V Muralidar
(74) *Attorney, Agent, or Firm* — Jackson Walker L.L.P.

(57) ABSTRACT

A battery management system, may include an input configured to couple to a power supply, an output configured to couple to a battery, and battery management circuitry coupled between the power supply and the battery and configured to deliver electrical energy to the output at a significantly higher peak-to-average power ratio than receipt of electrical energy to the input.

40 Claims, 4 Drawing Sheets

PULSED CURRENT BATTERY MANAGEMENT SYSTEM

RELATED APPLICATION

The present disclosure claims priority to U.S. Provisional Patent Application Ser. No. 63/179,946, filed Apr. 26, 2021, which is incorporated by reference herein in its entirety.

FIELD OF DISCLOSURE

The present disclosure relates in general to circuits for electronic devices, including without limitation personal audio devices such as wireless telephones and media players, and more specifically, a pulsed current battery management system.

BACKGROUND

Portable electronic devices, including wireless telephones, such as mobile/cellular telephones, tablets, cordless telephones, mp3 players, smart watches, health monitors, and other consumer devices, are in widespread use. Such a portable electronic device may include a battery (e.g., a lithium-ion battery) for powering components of the portable electronic device. Typically, such batteries used in portable electronic devices are rechargeable, such that when charging, the battery converts electrical energy into chemical energy which may later be converted back into electrical energy for powering components of the portable electronic device.

Recharging of rechargeable batteries often involves trading off between charging rate and battery life cycle. For example, a high level of current delivered to the battery may increase a charge rate for a battery, but may degrade the useful life of the battery. Pulsed current charging may be used to maximize charging rate of a battery without degrading the useful life of a battery. However, the high peak-to-average current required from a pulsed-current charger may be beyond the limits of traditional battery chargers, such as USB chargers.

SUMMARY

In accordance with the teachings of the present disclosure, one or more disadvantages and problems associated with existing approaches to battery charging may be reduced or eliminated.

In accordance with embodiments of the present disclosure, a battery management system, may include an input configured to couple to a power supply, an output configured to couple to a battery, and battery management circuitry coupled between the power supply and the battery and configured to deliver electrical energy to the output at a significantly higher peak-to-average power ratio than receipt of electrical energy to the input.

In accordance with these and other embodiments of the present disclosure, a method may include, with a battery management system coupled at an input of the battery management system to a power supply and coupled at an output of the battery management system to a battery; delivering electrical energy to the output at a significantly higher peak-to-average power ratio than receipt of electrical energy to the input.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
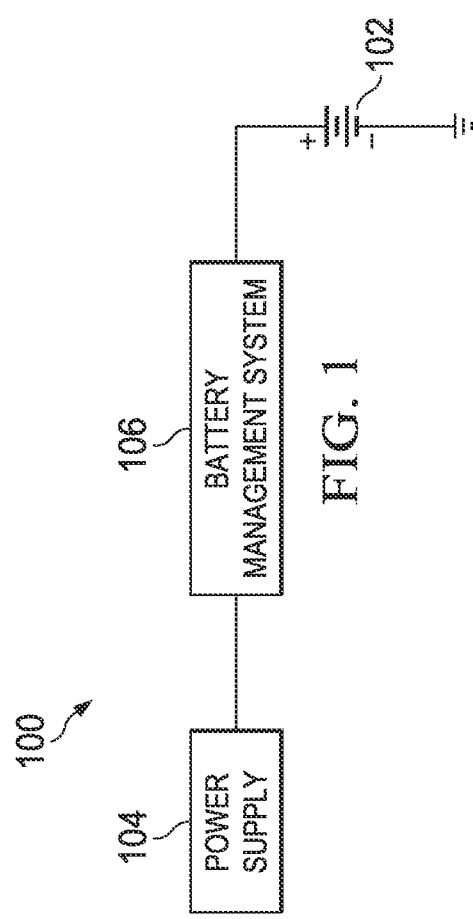
FIG. 1 illustrates an example system for charging a battery, in accordance with embodiments of the present disclosure.

FIG. 1 illustrates an example system 100 for charging a battery 102, in accordance with embodiments of the present disclosure. As shown in FIG. 1, system 100 may include battery 102, a power supply 104, and a battery management system 106.

Battery 102 may include any system, device, or apparatus configured to convert chemical energy stored within battery 102 to electrical energy. For example, in some embodiments, battery 102 may be integral to a portable electronic device and battery 102 may be configured to deliver electrical energy to components of such portable electronic device. Further, battery 102 may also be configured to recharge, in which it may convert electrical energy received by battery 102 into chemical energy to be stored for later conversion back into electrical energy. As an example, in some embodiments, battery 102 may comprise a lithium-ion battery.

Power supply 104 may include any system, device, or apparatus configured to supply electrical energy to battery management system 106. In some embodiments, power supply 104 may include a direct-current (DC) power source configured to deliver electrical energy at a substantially constant voltage. Accordingly, a peak-to-average power delivered from power supply 104 may be approximately equal to 1. In some of such embodiments, power supply 104 may include an alternating current (AC)-to-DC converter/adapter, configured to convert an AC voltage (e.g., provided by an electrical socket installed in the wall of a building) into a DC voltage. In some embodiments, power supply 104 may be power limited in terms of a maximum amount of power that may be drawn from power supply 104.

Battery management system 106 may include any system, device, or apparatus configured to receive electrical energy from power supply 104 and control delivery of such energy to battery 102, such that battery 102 may be charged using pulsed current charging, in a manner in which a peak-to-average power delivered from battery management system 106 to battery 102 may be significantly greater than 1 (e.g., 2 or more). In some embodiments, battery management system 106 may comprise a battery charger, configured to deliver electrical energy to battery 102 in order that battery 102 converts the electrical energy to chemical energy that is stored in battery 102. In some embodiments, battery management system 106 may include a wired charger configured to draw electrical energy from an electrical power outlet or from a power bank. In other embodiments, battery management system 106 may include a wireless charger configured to draw electrical energy via inductive coupling from a wireless charging pad or similar device.

Figure 2:
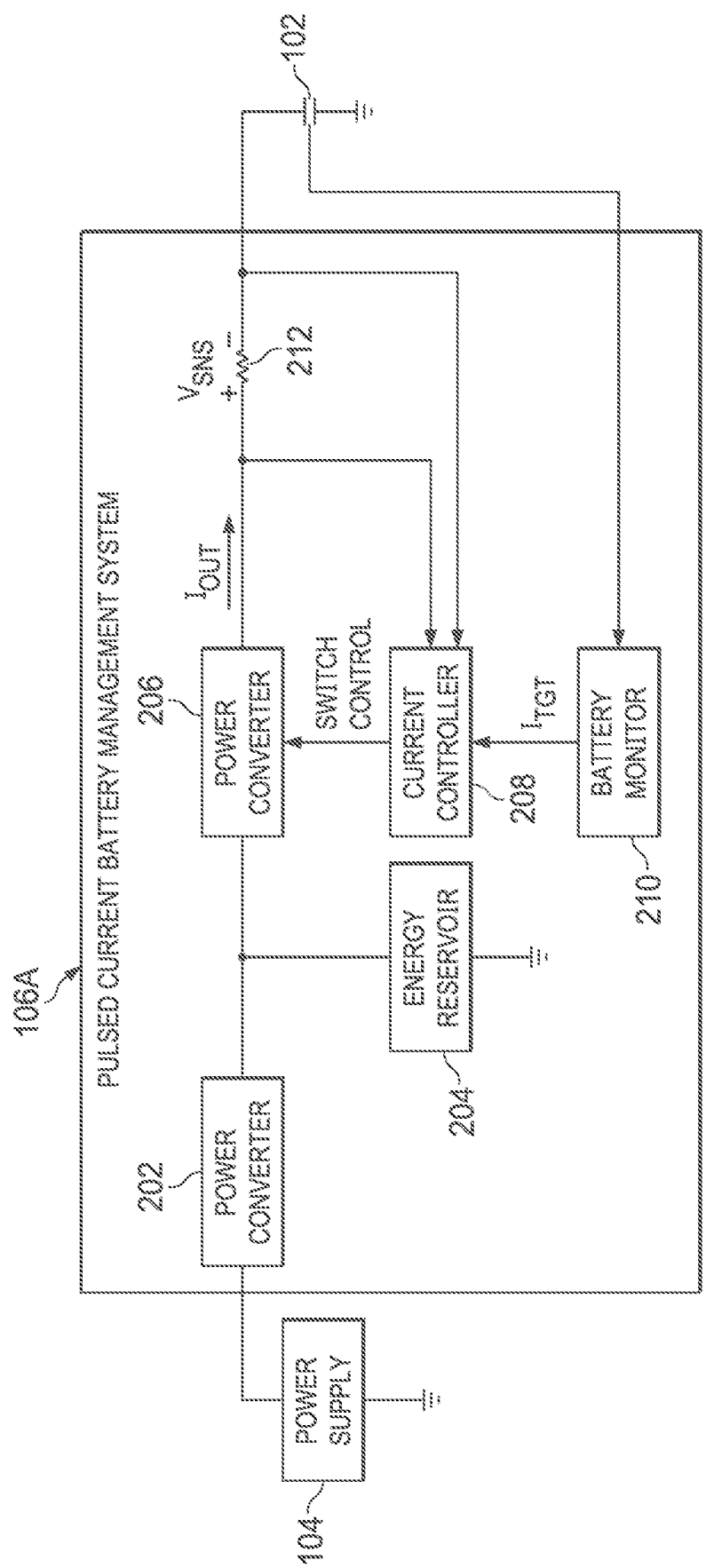
FIG. 2 illustrates an example pulsed current battery management system, in accordance with embodiments of the present disclosure.

FIG. 2 illustrates an example pulsed current battery management system 106A (coupled to a power supply 104 and a battery 102), in accordance with embodiments of the present disclosure. In some embodiments, pulsed current battery management system 106A shown in FIG. 2 may be used to implement battery management system 106 of FIG. 1. As shown in FIG. 2, pulsed current battery management system 106A may include a first power converter 202, an energy reservoir 204, a second power converter 206, a current controller 208, a battery monitor 210, and a sense resistor 212.

First power converter 202 may include any system, device, or apparatus configured to receive electrical energy from power supply 104 and use such received electrical energy to charge energy reservoir 204. In some embodiments, first power converter 202 may comprise a capacitive power converter or "charge pump." In other embodiments, first power converter 202 may comprise an inductor-based power converter (e.g., a buck converter, a buck-boost converter, or a boost converter).

Although FIG. 2 depicts power converter 202 interfaced between power supply 104 and energy reservoir 204, in some embodiments, power supply 104 may be coupled directly to energy reservoir 204 and thus configured to directly charge energy reservoir 204.

In some embodiments, a bandwidth of power converter 202 may be designed or chosen that enables a trade-off between the peak-to-average current from power supply 104 and a maximum peak current/power that may be delivered to battery 102.

Energy reservoir 204 may include any system, device, or apparatus configured to store electrical energy. For example, in some embodiments, energy reservoir 204 may comprise one or more capacitors. As another example, in some embodiments, energy reservoir 204 may comprise one or more batteries.

Second power converter 206 may include any system, device, or apparatus configured to, under the control of current controller 208, transfer electrical energy from energy reservoir 204 to battery 102 and use such received electrical energy to charge battery 102 by way of an output current $I_{OUT}$ delivered from second power converter 206 to battery 102. In some embodiments, second power converter 206 may comprise a capacitive power converter or "charge pump." In other embodiments, second power converter 206 may comprise an inductor-based power converter (e.g., a buck converter, a buck-boost converter, or a boost converter).

Figure 3:
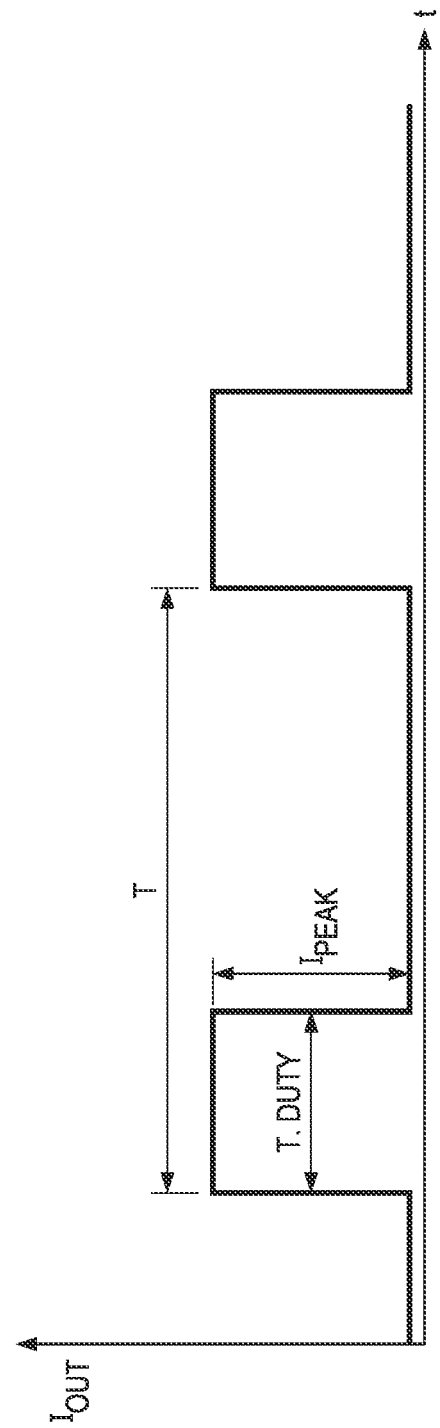
FIG. 3 illustrates an example output current waveform for charging a battery, in accordance with embodiments of the present disclosure.

Current controller 208 may include any system, device, or apparatus configured to, based on a sense voltage $V_{SNS}$ indicative of output current $I_{OUT}$ and a target current waveform $I_{TGT}$, control second power converter 206 (e.g., by controlling operation of switches internal to second power converter 206) in order to regulate output current $I_{OUT}$ in accordance with target current waveform $I_{TGT}$. In some embodiments, current controller 208 may control output current $I_{OUT}$ to have a pulsed waveform such that the power transfer from power converter 206 to battery 102 has a high peak-to-average power over time. For example, in some embodiments, output current $I_{OUT}$ may be a square wave with a defined peak amplitude IPEAK, defined period T, and defined duty cycle DUTY, as shown in FIG. 3. However, in other embodiments, output current $I_{OUT}$ may include a waveform of a different shape, including without limitation a triangular waveform, a sine wave, or any suitable combination of pulsed periodic waveforms.

Battery monitor 210 may include any system, device, or apparatus configured to monitor operational parameters associated with battery 102 (e.g., battery voltage, battery current, and battery temperature) and based on such operational parameters, estimate one or more battery conditions (e.g., battery state of charge, battery state of health, battery impedance, and internal chemical state of battery 102) associated with battery 102. Such estimations may be made based on an estimate of electrochemical impedance spectroscopy or a physics-based model of battery 102. Further, based on the operational parameters and/or battery conditions, battery monitor 210 may generate a target current waveform $I_{TGT}$ for charging battery 102. The algorithm for generating target current waveform $I_{TGT}$ is beyond the scope of this disclosure, but may comprise any suitable algorithm for optimizing (including for optimizing for tradeoffs) target current waveform $I_{TGT}$ in terms of efficiency, charge rate, battery useful life, and/or other factors. For example, such algorithm may seek to control output current $I_{OUT}$ to maximize charge rate while maintaining temperature and/or other parameters/conditions of battery 102 within safe operational limits. Further, in some embodiments, battery monitor 210 may embed signals within target current waveform $I_{TGT}$ designed to assist with obtaining operational parameters and/or estimate battery conditions.

Accordingly, current controller 208 and battery monitor 210 may operate in concert to adapt output current $I_{OUT}$ in accordance with operational parameters and conditions of battery 102. Such adaptation may attempt to minimize an effective impedance of battery 102, control a temperature associated with battery 102, and/or other parameters. In some embodiments, battery monitor 210 may perform monitoring of battery 102, estimation of conditions, and/or adapt output current $I_{OUT}$ while battery 102 is charging and/or when battery 102 is under load from a load powered by battery 102.

Sense resistor 212 may include any system, device, or apparatus configured to generate a sense voltage $V_{SNS}$ indicative of output current $I_{OUT}$, in accordance with Ohm's law.

Figure 4:
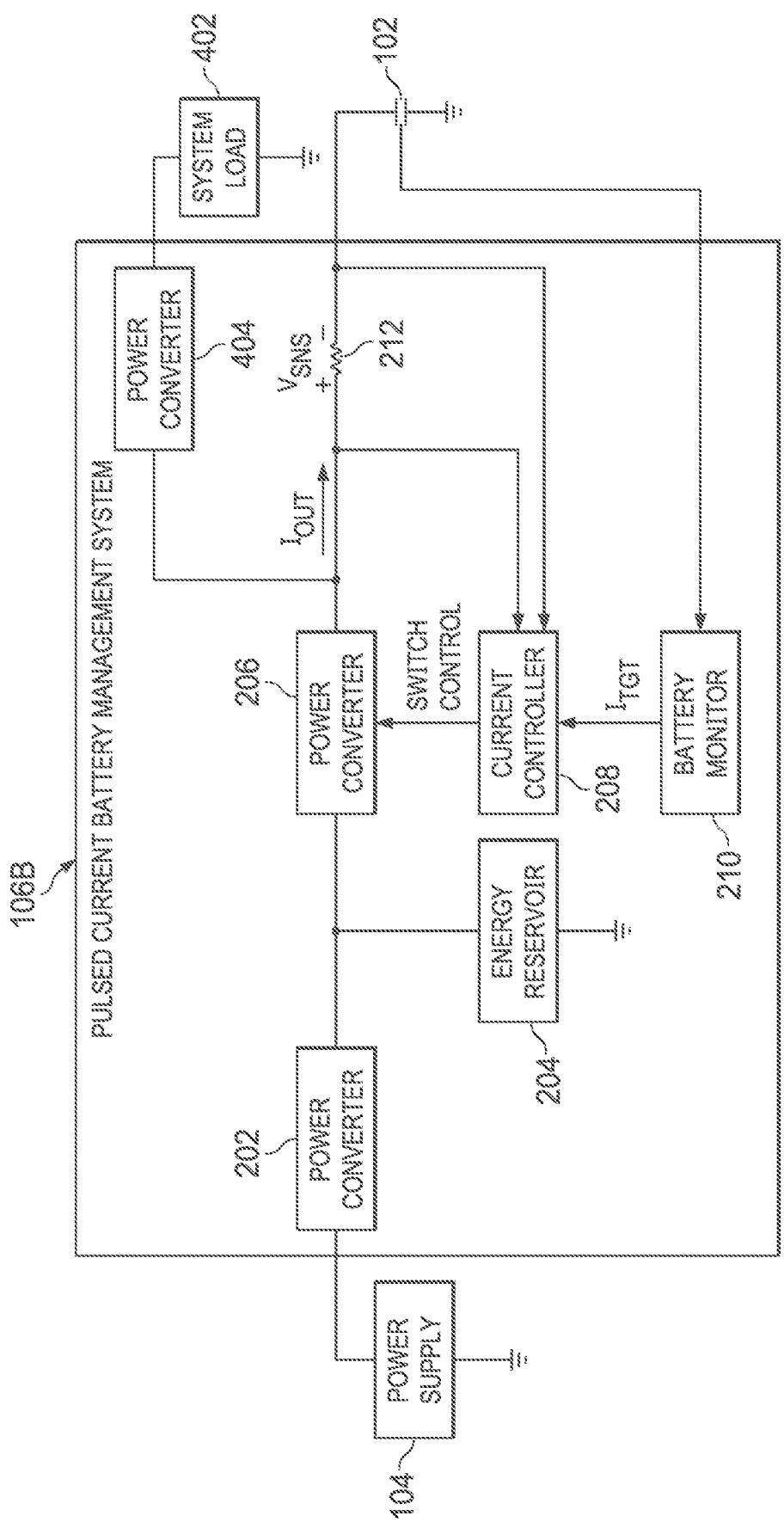
FIG. 4 illustrates another example pulsed current battery management system, in accordance with embodiments of the present disclosure.

FIG. 4 illustrates an example pulsed current battery management system 106B (coupled to a power supply 104, a battery 102, and a system load 402 of battery 102), in accordance with embodiments of the present disclosure. In some embodiments, pulsed current battery management system 106B shown in FIG. 4 may be used to implement battery management system 106 of FIG. 1. Pulsed current battery management system 106B shown in FIG. 4 may be similar in many respects to pulsed current battery management system 106A shown in FIG. 2. Accordingly, only certain differences between pulsed current battery management system 106B and pulsed current battery management system 106A are discussed below.

For example, as shown in FIG. 4, pulsed current battery management system 106B may include a third power converter 404 coupled between the output of second power converter 206 and a system load 402 of battery 102. System load 402 may represent one or more components (e.g., of a portable electronic device including battery 102) configured to be powered from battery 102.

Third power converter 404 may include any system, device, or apparatus configured to transfer electrical energy from the output of second power converter 206 to system load 402. Further, in the architecture shown in FIG. 4, third power converter 404 may also transfer electrical energy from battery 102 to system load 402. In some embodiments, third power converter 404 may comprise a capacitive power converter or "charge pump." In other embodiments, third power converter 404 may comprise an inductor-based power converter (e.g., a buck converter, a buck-boost converter, or a boost converter).

Although FIG. 4 depicts third power converter 404 coupled between the output of second power converter 206 and system load 402 of battery 102, in other embodiments, third power converter 404 may instead be coupled between energy reservoir 204 and system load 402 of battery 102, such that third power converter 404 is configured to transfer electrical energy from energy reservoir 204 to system load 402. In yet other embodiments, third power converter 404 may instead be coupled between power supply 104 and system load 402 of battery 102, such that third power converter 404 is configured to transfer electrical energy from power supply 104 to system load 402.

In any event, in these architectures, current controller 208 may control only a current delivered to battery 102, but does not control current delivered to system load 402.

Figure 5:
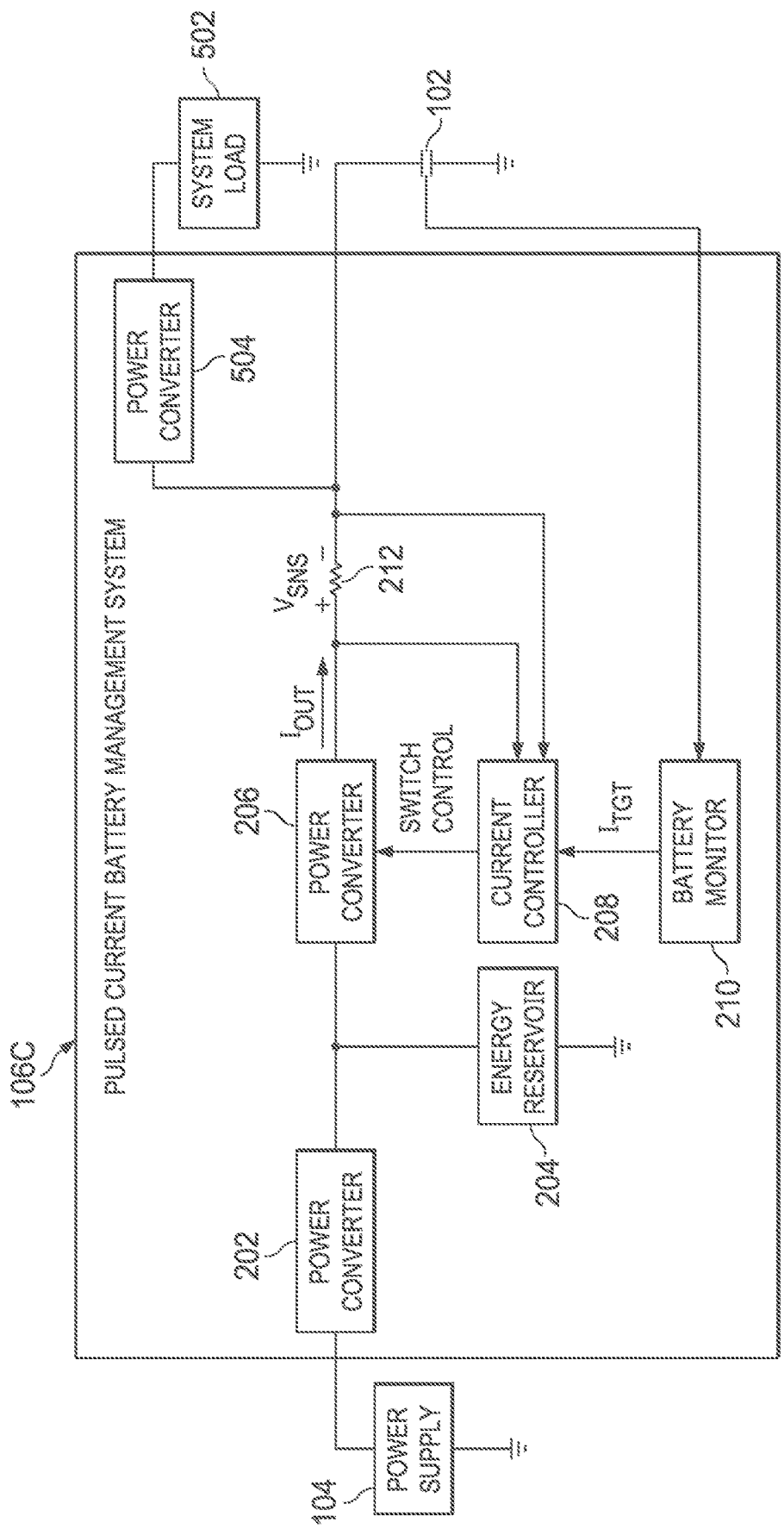
FIG. 5 illustrates yet another example pulsed current battery management system, in accordance with embodiments of the present disclosure.

FIG. 5 illustrates an example pulsed current battery management system 106C (coupled to a power supply 104, a battery 102, and a system load 502 of battery 102), in accordance with embodiments of the present disclosure. In some embodiments, pulsed current battery management system 106C shown in FIG. 5 may be used to implement battery management system 106 of FIG. 1. Pulsed current battery management system 106C shown in FIG. 5 may be similar in many respects to pulsed current battery management system 106A shown in FIG. 2. Accordingly, only certain differences between pulsed current battery management system 106C and pulsed current battery management system 106A are discussed below.

For example, as shown in FIG. 5, pulsed current battery management system 106C may include a third power converter 504 coupled directly between battery 102 and a system load 502 of battery 102. System load 502 may represent one or more components (e.g., of a portable electronic device including battery 102) configured to be powered from battery 102.

Third power converter 504 may include any system, device, or apparatus configured to, transfer electrical energy from the output of battery 102 to system load 502. In addition, third power converter 504 may also transfer electrical energy from the output of second power converter 206 to system load 502. In some embodiments, third power converter 504 may comprise a capacitive power converter or "charge pump." In other embodiments, third power converter 504 may comprise an inductor-based power converter (e.g., a buck converter, a buck-boost converter, or a boost converter).

A notable difference between pulsed current battery management system 106C shown in FIG. 5 versus pulsed current battery management system 106B shown in FIG. 4 is that in pulsed current battery management system 106C, current controller 208 may control only the sum of the current delivered to battery 102 and the current delivered to system load 502. Thus, in pulsed current battery management system 106C, when an output current limit of power converter 206 is exceeded, battery 102 may also provide electrical energy to system load 502, in addition to electrical energy provided by power converter 206.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A battery management system, comprising:
   an input configured to couple to a direct-current power supply and receive a direct-current voltage at the input from the direct-current power supply;
   an output configured to couple to a battery; and
   battery management circuitry coupled between the direct-current power supply and the battery, wherein the battery management circuitry comprises:
   an energy reservoir;
   a first power converter interfaced between the energy reservoir and the input and configured to transfer electrical energy from the input to the energy reservoir; and
   a second power converter interfaced between the energy reservoir and the output and configured to deliver electrical energy to the output at a significantly higher peak-to-average power ratio than receipt of electrical energy to the input.

2. The battery management system of claim 1, further comprising a third power converter interfaced between the battery and a load that draws electrical energy from the battery.

3. The battery management system of claim 1, wherein a bandwidth of the second power converter is based on a trade-off between a peak-to-average current delivered from the direct-current power supply and a maximum current deliverable to the battery.

4. The battery management system of claim 1, further comprising a current controller configured to regulate an output current generated by the power converter.

5. The battery management system of claim 4, wherein the current controller is configured to regulate the output current based on a measurement of the output current and a target current waveform.

6. The battery management system of claim 5, wherein the battery management circuitry further comprising a battery monitor configured to monitor at least one operational parameter of the battery.

7. The battery management system of claim 6, wherein the at least one operational parameter comprises one or more of a current associated with the battery, a voltage associated with the battery, and a temperature associated with the battery.

8. The battery management system of claim 6, wherein the battery monitor is configured to generate the target current waveform based on the at least one operational parameter.

9. The battery management system of claim 6, wherein the battery monitor is configured to estimate at least one condition of the battery based on the at least one operational parameter.

10. The battery management system of claim 9, wherein the at least one condition comprises one or more of a battery state of charge, a battery state of health, a battery impedance, and an internal chemical state of the battery.

11. The battery management system of claim 9, wherein the battery monitor is configured to generate the target current waveform based on the at least one condition.

12. The battery management system of claim 6, wherein the battery monitor is configured to dynamically adapt the target current waveform based on the at least one operational parameter.

13. The battery management system of claim 12, wherein the battery monitor is configured to dynamically adapt the target current waveform to minimize the battery impedance.

14. The battery management system of claim 12, wherein the battery monitor is configured to dynamically adapt the target current waveform to control an impedance associated with the battery.

15. The battery management system of claim 12, wherein the battery monitor is configured to dynamically adapt the target current waveform while the battery is charging from the battery management circuitry.

16. The battery management system of claim 12, wherein the battery monitor is configured to dynamically adapt the target current while the battery is under load from a load powered from the battery.

17. The battery management system of claim 5, wherein the target current waveform is one of a square waveform, a triangle waveform, or a sawtooth waveform.

18. The battery management system of claim 5, wherein the output current controlled by the current controller is delivered to the battery.

19. The battery management system of claim 5, wherein the output current controlled by the current controller is delivered to the battery and a load powered from the battery.

20. A method comprising, with a battery management system coupled at an input of the battery management system to a direct-current power supply and coupled at an output of the battery management system to a battery, wherein the input is configured to receive a direct-current voltage at the input from the direct-current power supply:
   transferring electrical energy from the input to an energy reservoir via a first power converter interfaced between the energy reservoir and the input; and
   delivering electrical energy to the output via a second power converter interfaced between the energy reservoir and the output at a significantly higher peak-to-average power ratio than receipt of electrical energy to the input.

21. The method of claim 20, wherein the battery management system has third power converter interfaced between the battery and a load that draws electrical energy from the battery.

22. The method of claim 20, wherein a bandwidth of the second power converter is based on a trade-off between a peak-to-average current delivered from the direct-current power supply and a maximum current deliverable to the battery.

23. The method of claim 20, further comprising regulating an output current generated by the power converter.

24. The method of claim 23, further comprising regulating the output current based on a measurement of the output current and a target current waveform.

25. The method of claim 24, further comprising monitoring at least one operational parameter of the battery.

26. The method of claim 25, wherein the at least one operational parameter comprises one or more of a current associated with the battery, a voltage associated with the battery, and a temperature associated with the battery.

27. The method of claim 25, further comprising generating the target current waveform based on the at least one operational parameter.

28. The method of claim 25, further comprising estimating at least one condition of the battery based on the at least one operational parameter.

29. The method of claim 28, wherein the at least one condition comprises one or more of a battery state of charge, a battery state of health, a battery impedance, and an internal chemical state of the battery.

30. The method of claim 28, further comprising generating the target current waveform based on the at least one condition.

31. The method of claim 25, further comprising dynamically adapting the target current waveform based on the at least one operational parameter.

32. The method of claim 31, further comprising dynamically adapting the target current waveform to minimize the battery impedance.

33. The method of claim 31, further comprising dynamically adapting the target current waveform control an impedance associated with the battery.

34. The method of claim 31, further comprising dynamically adapting the target current waveform while the battery is charging from the battery management circuitry.

35. The method of claim 31, further comprising dynamically adapting the target current while the battery is under load from a load powered from the battery.

36. The method of claim 24, wherein the target current waveform is one of a square waveform, a triangle waveform, and a sawtooth waveform.

37. The method of claim 24, wherein the regulated output current is delivered to the battery.

38. The method of claim 24, wherein the regulated output current is delivered to the battery and a load powered from the battery.

39. The method of claim 20, wherein the power converter is a switching power converter.

40. The battery management system of claim 1, wherein the power converter is a switching power converter.

* * * * *